(No Model.)

F. E. CUDELL.
SEWER GAS TRAP.

No. 348,830. Patented Sept. 7, 1886.

Witness,
Geo. B. Tibbitts.
D. R. Tibbitts.

Inventor,
Frank E. Cudell.
By Geo. W. Tibbitts Atty.

UNITED STATES PATENT OFFICE.

FRANK E. CUDELL, OF CLEVELAND, OHIO.

SEWER-GAS TRAP.

SPECIFICATION forming part of Letters Patent No. 348,830, dated September 7, 1886.

Application filed June 14, 1886. Serial No. 205,178. (No model.)

*To all whom it may concern:*

Be it known that I, FRANK E. CUDELL, of Cleveland, in the county of Cuyahoga and State of Ohio, have invented certain new and useful Improvements in Sewer-Gas Traps, of which the following is a specification.

This invention consists in the peculiar construction and arrangement of the outlet-pipe with the trap, whereby said outlet-pipe is capable of adjustment in relative position to the chamber of the trap, enabling the trap to be used as a full S, half S, three-quarter S, or a running trap, as may be required.

The invention further consists in the peculiar manner of securing or soldering the said outlet-pipe to the trap-chamber.

Figure 3:
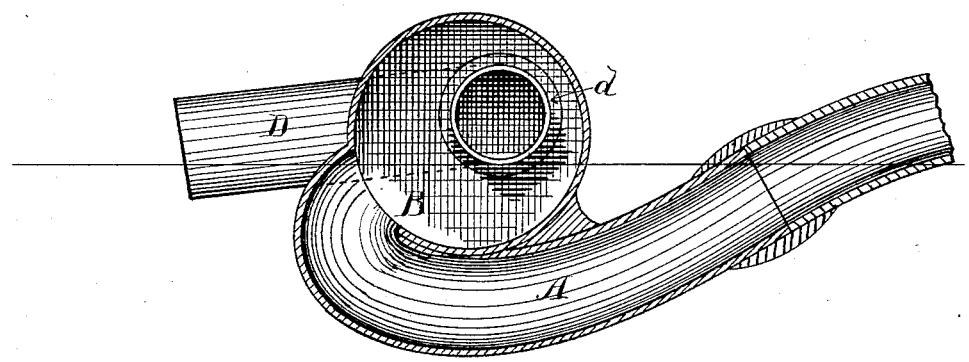
Figures 1, 2:
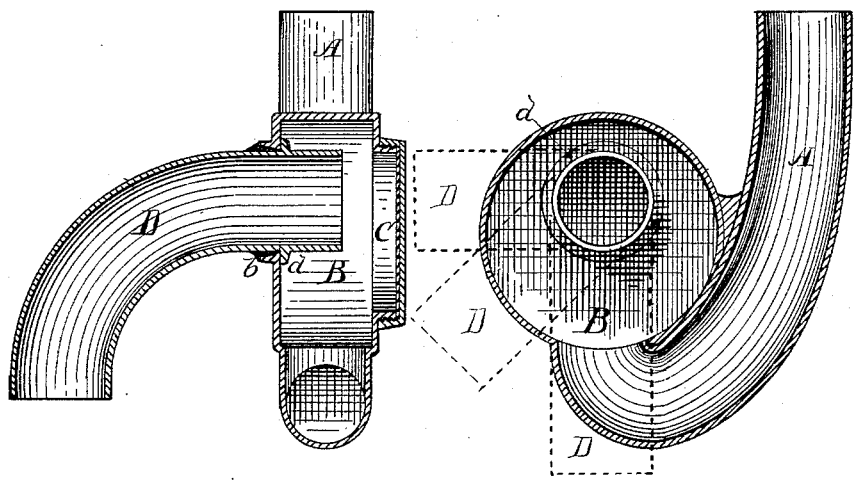

In the accompanying drawings, Figure 1 is a vertical section of my trap, showing the outlet-pipe attachment. Fig. 2 is a transverse vertical section showing by dotted lines the different positions of adjusting the outlet-pipe to form the various kinds of traps, as above mentioned. Fig. 3 is a sectional view showing the position as a running trap.

A is the inlet-pipe leading into a chamber, B, both of which are cast together in one piece. One side of said chamber is made with a large opening provided with a neck or flange, onto which a cap, C, is screwed for closing said opening, a suitable packing or gasket being employed to insure a tight joint.

D is an outlet-pipe, fixed in the wall of the chamber B, opposite to the opening C. The pipe D is provided with a flange, *d*, forming a shoulder on the pipe, which rests against the inside face of the wall. The pipe D is curved in form, and is inserted through the opening C into the hole in the wall from the inside. The hole in which said pipe D is fixed has a flange, *b*, surrounding it on the outer face of the chamber-wall, the inside surface of which is beveled, leaving a space for the solder to occupy in securing the pipe D in place. The inner end of the said pipe D may project into the chamber a considerable distance, or not, as may be desired. The projection is preferable, however, to prevent the liability of the trap being entirely emptied by siphoning.

From the foregoing description, and by referring to Fig. 2 of the drawings, it will be seen that in setting this trap the plumber may arrange the outlet-pipe D in either of the positions indicated by the dotted lines before soldering it to accommodate the trap to the conditions of the setting. This method of securing the pipe with a flange on the inside of the wall and soldering on the outside makes a stiff and strong joint, bracing it both on the inside and outside alike.

Having described my invention, I claim—

1. In a sewer-gas trap, the combination, with the inlet-pipe A, having chamber B secured thereto, of outlet-pipe D, with inward projection, and attached in manner described, whereby said outlet-pipe may be adjusted to make either a full S, half S, three-quarter S, or a running trap, substantially as specified.

2. The combination, with the inlet A and chamber B of a sewer-gas trap, of the outlet-pipe D, having a shoulder or flange, *d*, said pipe being inserted through opening C into hole in chamber-wall, and secured therein by flange on the inside and the solder on the outside of the wall, substantially as described.

FRANK E. CUDELL.

Witnesses:
  GEO. W. TIBBITTS,
  F. W. CADWELL.